United States Patent [19]

Yuge et al.

[11] 3,910,042
[45] Oct. 7, 1975

[54] SYSTEM FOR PURIFYING EXHAUST GAS FROM AN INTERNAL COMBUSTION ENGINE

[75] Inventors: Haruki Yuge; Masami Oki, both of Nagoya; Naoto Miwa, Kariya, all of Japan

[73] Assignees: Nippondenso Co., Ltd., Kariya; Nippon Soken, Inc., Nishio, both of Japan

[22] Filed: May 4, 1973

[21] Appl. No.: 357,268

[30] Foreign Application Priority Data
May 8, 1972  Japan.............................. 47-45244

[52] U.S. Cl................... 60/286; 23/288 F; 60/298; 60/300
[51] Int. Cl.² ............................................. F01N 3/14
[58] Field of Search ............ 60/284, 286, 298, 300, 60/307, 288, 289; 23/288 F

[56] References Cited
UNITED STATES PATENTS

| | | | |
|---|---|---|---|
| 2,864,960 | 12/1958 | Linde | 60/303 |
| 3,086,839 | 4/1963 | Bloch | 60/288 |
| 3,100,140 | 8/1963 | Ashley | 23/288 F |
| 3,168,806 | 2/1965 | Calvert | 60/284 |
| 3,201,206 | 8/1965 | Wawrziniok | 60/288 |
| 3,295,919 | 1/1967 | Henderson | 60/298 |
| 3,303,003 | 2/1967 | Zimmer | 60/289 |
| 3,775,064 | 11/1973 | Berger | 60/307 |
| 3,779,015 | 12/1973 | Maruoka | 60/300 |

*Primary Examiner*—Douglas Hart
*Attorney, Agent, or Firm*—Cushman, Darby & Cushman

[57] ABSTRACT

A system for purifying exhaust gas from an internal combustion engine comprises a catalytic reactor housing in which a catalytic reaction bed is housed. The bed defines therein first and second groups of passages arranged in heat-exchange relationship. The first group of passages is for the exhaust gas while the second group of passages is for air to control the temperature in the bed. A thermocouple detects the temperature in the bed and emits a signal which a comparator compares with reference signals and is operative to cause a blower to be driven so that air is forced into and flows through the second group of passages in the bed to cool the same when the temperature detected is above a predetermined range to thereby prevent catalyst in the bed from being melted. An electric heater is additionally provided in an air supply tube between the blower and the reactor. When the temperature is below the lower limit of the predetermined temperature range, the comparator operates to cause the blower to be also operated and, at the same time, cause the heater to be energized so that the air supplied to the bed is heated to heat the bed to a temperature at which the catalyst is appropriately activated.

13 Claims, 3 Drawing Figures

SYSTEM FOR PURIFYING EXHAUST GAS FROM AN INTERNAL COMBUSTION ENGINE

BACKGROUND OF THE INVENTION

1. Field of the Invention

The present invention relates to a system for purifying exhaust gas from an internal combustion engine for use, for example, with an automobile.

2. Description Of Prior Art

It has been known that exhaust gas from an internal combustion engine is purified by a catalytic reactor housing a catalytic reaction bed which contains catalyst disposed so as to be in contact with the exhaust gas. The unburnt combustible gaseous components of the exhaust gas are burnt in the catalytic reactor by catalytic reaction in the reactor. However, the prior art catalytic reactor encounters a problem that, if a large amount of unburnt combustible gaseous components is produced due, for example, to misfire, the catalytic reaction bed is overheated with a resultant disadvantage that the catalyst is deteriorated and a catalyst carrier is melted.

Exhaust gas from an internal combustion engine is at a relatively low temperature, i.e., about 200°C immediately after the engine is cold-started. The exhaust gas is cooled to about 150°C by the time when the gas is reached by and passes through a catalytic reaction bed in the prior art catalytic reactor. This temperature is insufficient to completely activate catalyst in the catalytic reaction bed because most catalyst currently utilized to purify engine exhaust gas is known to become fully activated at a temperature ranging from 150° to 200°C. Thus, if exhaust gas from an internal combustion engine is cooled down to less than 150°C, the unburnt combustible gaseous components of the exhaust gas are not subjected to complete catalytic reaction.

SUMMARY OF THE INVENTION

It is an object of the present invention to provide a system for purifying exhaust gas from an internal combustion engine in which a catalytic reaction bed is prevented from being overheated.

It is another object of the present invention to provide a system of the class referred to in the preceding paragraph and in which the catalytic reaction bed when cooled down to less than predetermined temperature is positively heated to enable a catalyst in the reaction bed to be fully activated.

According to one feature of the invention, there is provided a system for purifying exhaust gas from an internal combustion engine, comprising a catalytic reactor including a housing and a catalytic reaction bed disposed therein, said bed defining therein first and second groups of passages arranged in heat-exhange relationship, said first group of passages being adapted to pass the exhaust gas therethrough;

means on said catalytic reactor for detecting the temperature in said bed and producing a signal representing the detected temperature, and means operable in response to the signal from said temperature detecting means to supply temperature controlling gas to said catalytic reactor, the supplied gas passing through said second group of passages in said bed to maintain said catalytic reactor substantially below a predetermined temperature.

According to another feature of the invention, there is provided a system for purifying exhaust gas from an internal combustion engine, said system comprising;

a catalytic reactor including a housing and a catalytic reaction bed disposed therein, said bed defining therein first and second groups of passages arranged in heat-exchange relationship, said first group of passages being adapted to pass the exhaust gas therethrough;

means on said catalytic reactor for detecting the temperature in said bed and producing a signal representing the detected temperature; and means operable in response to the signal from said temperature detecting means to supply temperature controlling gas to said catalytic reactor;

said temperature controlling gas being air;

said signal responsive means including a blower pneumatically connected to said housing, said blower being adapted to be operated when the temperature in said catalytic reaction bed is outside a predetermined temperature range, said signal responsive means further including means for heating the temperature controlling gas supplied by said blower to said catalytic reactor, said heating means being adapted to be energized when the temperature in said catalytic reaction bed is lower than the lower limit of said predetermined temperature range.

The catalytic reaction bed may preferably be formed of a catalyst carrier which includes at least a unit of laminated structure comprising a plurality of sheets or plates of ceramic material. Some of the ceramic plates are corrugated and the remaining plates are substantially flat. The corrugated flat plates are disposed one on another so that the first and second groups of passages are defined therebetween.

The temperature detecting means may preferably comprise a thermocouple. Alternatively, the temperature detecting means may comprise a thermistor.

The signal responsive means of the system according to the one feature of the invention may preferably include a blower pneumatically connected to the reactor housing. The blower may preferably electrically connected to a comparator which receives the signal from the temperature detecting means and operates in response to the signal to close a circuit including a motor which is drivingly connected to the blower. The comparator may preferably include a comparing circuit in which a potentiometer is connected to a reference voltage supply source and to one of the output terminals of the temperature detecting means. The comparing circuit may preferably have its output terminals connected to an amplifier to which a solenoid unit is electrically connected. The solenoid unit may have its armature operatively connected to switch in the circuit which includes the motor.

The signal responsive means of the system according to the other feature of the present invention may preferably include a comparator which preferably includes a pair of comparing circuits each including a potentiometer connected to a reference voltage supply source and to one of the output terminals of the temperature detecting means. The first comparing circuit may preferably be connected to an amplifier having output terminals connected to a first solenoid unit having its armature operatively connected to a first switch in an electric circuit which includes a motor for driving the blower. The second comparing circuit may preferably be connected to another amplifier having output terminals connected to a second solenoid unit having its armature operatively connected to a switch in a circuit including the heating means and to a second switch connected in parallel to first switch in the electric circuit which includes the motor.

The above and other objects, features and advantages of the present invention will be made apparent by the following description with reference to the accompanying drawings.

DESCRIPTION OF A PREFERRED EMBODIMENT

The system is generally indicated by 10 and includes a housing 16 of a catalytic reactor to be described later. The reactor housing 16 is connected to an exhaust pipe 14 of an internal combustion engine 12 to receive exhaust gas from the engine. The catalytic reactor is designed to purify the exhaust gas while the gas is passed therethrough. The purified gas is discharged from the reactor through a discharge pipe 18 connected to the reactor housing 16. The discharge pipe is advantageously axially aligned with the exhaust pipe 14 connected to the housing 16.

Figure 2:
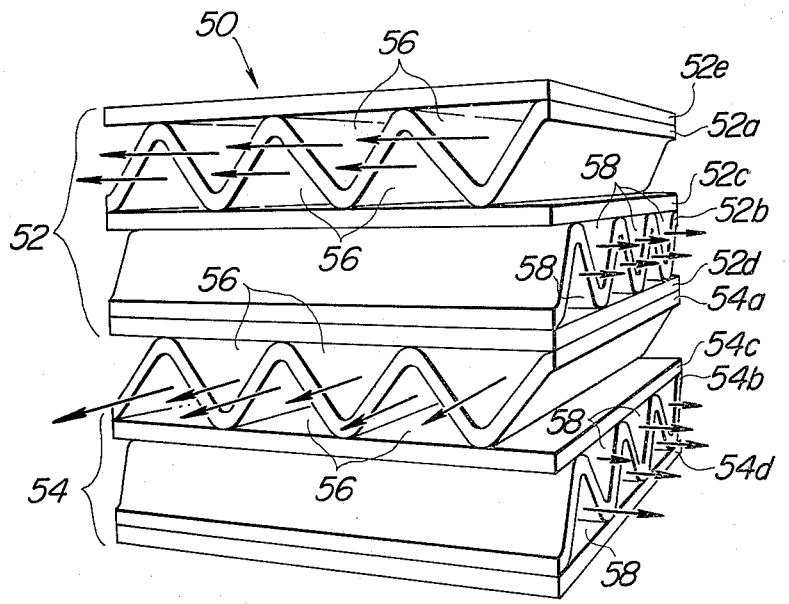
FIG. 2 is an enlarged perspective view of a catalyst carrier in a catalytic reactor of the system shown in FIG. 1.

A catalytic reaction bed 50, as shown in FIG. 2, is housed in the reactor housing 16 for the purification of exhaust gas. The catalytic reactor is provided with a temperature detecting means in the form of a thermocouple 22 mounted on the reactor housing 16 and extending into the catalytic reaction bed 50 to detect the temperature therein. The thermocouple 22 is electrically connected to a comparator 24 so that a signal in the form of an electric voltage generated by the thermocouple is supplied to the comparator 24. The latter compares the signal with reference signals, as will be described in more detail later, and causes a blower 28 to be operated to supply air into the catalytic reaction bed 50 through an air supply conduit 32 extending between the blower 28 and the reactor housing 16 for thereby controlling the temperature in the reaction bed 50. An air discharge conduit 34 is connected to the reactor housing 16 to discharge the air used to control the temperature in the reaction bed 50.

Referring to FIG. 2, the catalytic reaction bed 50 is advantageously formed of a catalyst carrier which includes a plurality of units of laminated structures 52 and 54. The laminated structure unit 52 includes a pair of corrugated sheets or plates 52a and 52b of ceramic material, a substantially flat ceramic sheet or plate 52c sandwiched therebetween and substantially flat additional ceramic sheets or plates 52d and 52e disposed in contact with the outer surfaces of the corrugated plates 52a and 52b. The corrugated plate 52a cooperates with the flat plates 52c and 52e to define therebetween a part of a first group of passages 56 while the other corrugated plate 52b cooperates with the flat plates 52c and 52d to define therebetween a part of a second groups of passages 58.

The other laminated structure unit 54 includes corrugated sheet or plate 54a and substantially flat sheets or plates 54c and 54d arranged in substantially the same manner as in the laminated structure unit 52, the flat plate 52d being utilized in common with both units 52 and 54. The unit 54 defines therein additional parts of the first and second groups of passages 56 and 58.

Advantageously, the corrugated plates 52a and 54a are so disposed with respect to the remaining corrugated plates 52b and 54b that the first group of passages 56 extends substantially at right angles with respect to the second group of passages 58. One of the first and second groups of passages 56 and 58 is used to pass therethrough the exhaust gas from the internal combustion engine 12 while the other group of passages is utilized to pass the temperature controlling gas therethrough. The latter gas is advantageously air. It will be apparent to those skilled in the art that catalyst may be mounted or disposed on those surfaces of the ceramic plates which define the exhaust gas passages. In addition, the first and second groups of passages may be inclined or oblique with respect to each other provided that the groups of passages extend in heat-exchange relationship to each other.

Figure 3:
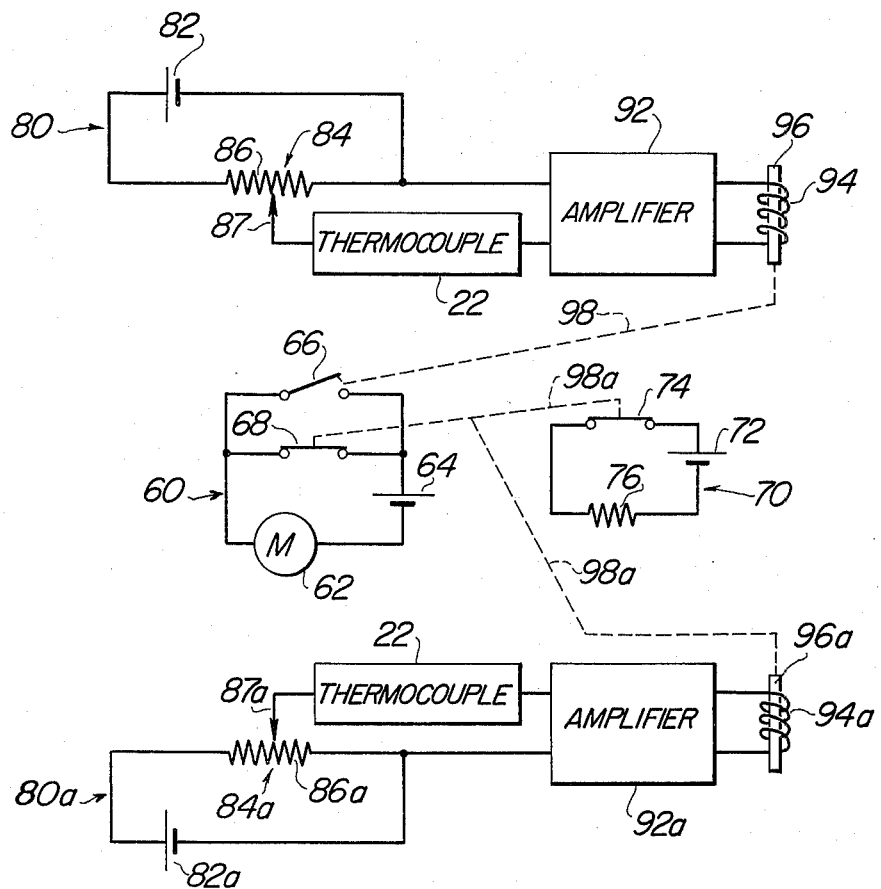
FIG. 3 is a block diagram illustrating electric circuits of the system shown in FIG. 1.

Referring to FIG. 3, the blower 28 is drivingly connected to an electric motor 62 connected in an electric circuit 60 which includes an electric power source 64 and a switch 66.

Figure 1:
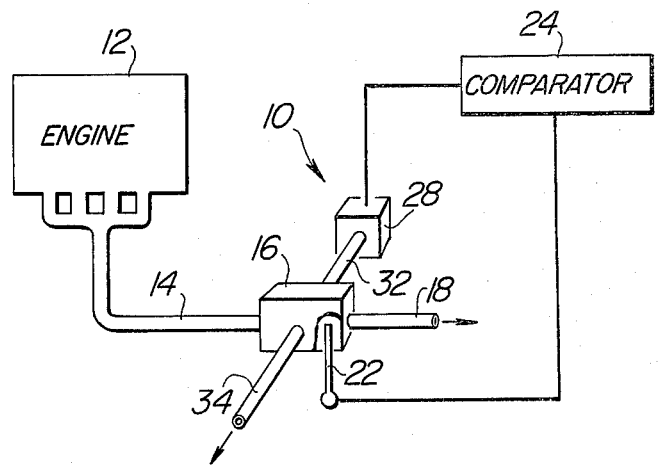
FIG. 1 is a diagrammatic illustration of an embodiment of the system according to the present invention.

The comparator 24 shown in FIG. 1 includes a comparing circuit 80 having a reference electric power source 82 and a potentiometer 84 which is formed by a resistor 86 and a brush 87 which is in sliding contact therewith and electrically connected to one of the output terminals of the thermocouple 22. An amplifier 92 is advantageously connected to the comparing circuit 80 and to the other output terminal of the thermocouple 22. The amplifier 92 has its output terminals electrically connected to a solenoid unit formed by an electromagnetic coil 94 and an armature 96 movable within the coil 94. The armature 96 is operatively connected to the switch 66 in the circuit 60 by any conventional connecting means such as mechanical elements as indicated by broken line 98 so that the opening and closing of the switch 66 is controlled by the movement of the armature 96 in the solenoid unit. The arrangement is such that, when the thermocouple 22 detects a temperature in the catalytic reaction bed 50 which is higher than a predetermined temperature, the solenoid unit is energized to close the circuit 60 so that the motor 62 is energized to drive the blower 28 for the supply of temperature controlling air to the reactor 16.

The illustrated embodiment of the invention advantageously includes a further electric circuit 70 comprising a second electric power source 72, a second switch 74 and an electric heater 76 for heating air supplied to the reactor 16 when the temperature therein is below a second predetermined temperature which is lower than the first predetermined temperature.

For this purpose, the comparator 24 further includes a second comparing circuit 80a similar to the comparing circuit 80 with the exception that the comparing circuit 80a is provided to control the opening and closing of the switch 74 in the circuit 70 and of a further switch 68 connected to the circuit 60 in parallel with the switch 66. The components of the second comparing circuit 80a are indicated by reference numerals similar to those to the corresponding elements of the first comparing circuit 80 but added with a letter *a* at the ends of the reference numerals. The arrangement is such that, when the temperature in the catalytic reaction bed 50 as detected by the thermocouple 22 is below the second predetermined temperature. a solenoid 94*a* is energized to close the switch 68 of the circuit 60 and the switch 74 of the circuit 70 so that not only the blower 28 is driven to supply air to the catalytic reactor 16 but also the heater 76 is energized to heat the air supplied to the reactor. The heater is advantageously disposed in the air supply pipe 32.

In operation, exhaust gas produced by the engine 12 is exhausted through the exhaust pipe 14 into the catalytic reactor 16 in which the catalytic reaction bed 50 is housed. The exhausted gas is caused to flow through one of the first and second groups of passages 56 and 58 formed in the bed 50 and is then discharged through the discharge pipe 18 into the atmosphere.

The thermocouple 22 detects the temperature in the catalytic reaction bed 50 and generates an electric voltage which is applied to the potentiometers 84 and 84*a*. When the detected temperature is higher than the first predetermined temperature, for example, 700°C, the first comparing circuit 80 operates to actuate the solenoid 94 for closing only the switch 66 of the circuit 60 so that the blower 28 is driven to supply temperature controlling or cooling air into the catalytic reactor 16. The supplied cooling air is caused to flow through the other of the first and second groups of passages 56 and 58 so that heat is exchanged between the fluids flowing through these passages, the cooling air being then discharged from the reactor 16 through the discharge conduit 34 into the atmosphere. Thus, the catalytic reaction bed 50 can be maintained substantially below 700°C to advantageously prevent the catalyst on the catalyst carrier from being damaged due to partial melt thereof which would otherwise be caused by an elevated temperature in the catalytic reaction bed 50.

In general, exhaust gas from the engine 12 is about 200°C immediately after cold-starting of the engine. The exhaust gas is cooled down to about 150°C when the gas arrives at and passes through the catalytic reaction bed 50. This involves a disadvantageous possibility that the cooled exhaust gas is discharged from the reactor 16 without being purified, i.e., without having a catalytic reaction with the catalyst in the bed 50 because most catalyst currently used to purify engine exhaust gas becomes completely active at a temperature ranging from 150° to 200°C.

With the system of the present invention, when the temperature in the catalytic reaction bed 50 as detected by the thermocouple 22 is below the second predetermined temperature, for example, 300°C, the second comparing circuit 80*a* operates to energize the solenoid unit 94*a* for closing the switches 68 and 74 in the circuits 60 and 70, respectively, so that not only the blower 28 is driven to supply air to the reactor 16 but also the heater 76 in the air supply pipe 32 is energized to heat the supplied air. The heated air is caused to flow through the catalytic reaction bed 50 to heat the same. A test has shown that, when the catalytic reaction bed is heated to a temperature ranging from 200° to 300°C, the catalyst in the catalytic reaction bed is caused to have a complete active reaction with the exhaust gas from the engine.

Another test has been conducted in such a manner the exhaust gas from an internal combustion engine is fed to the catalytic reaction bed 50 of the system of the invention under the conditions substantially the same as in the prior art previously discussed and the first comparing circuit 80 is set to operate when the temperature in the reaction bed 50 is elevated to about 650°C. The test has shown that cold air is supplied to the catalytic reaction bed 50 as the temperature therein rises with a result that the temperature in the bed is prevented from being elevated above 700°C and the exhaust gas is completely purified.

A further test has been conducted in such a manner that exhaust gas from an internal combustion engine is maintained substantially at 180°C and is fed to the system according to the present invention. The test has shown that the exhaust gas is completely purified (100 % purification) whereas a prior art system, with which a similar text has been carried out, has exhibitted 70 % purification.

What is claimed is:

1. A system for purifying exhaust gas from an internal combustion engine, said system comprising:
   a. a catalytic reactor including a housing and a catalytic reaction bed disposed therein, said bed including a plurality of side walls defining therein first and second groups of passages arranged in heat-exchange relationship, the walls of said first group of passages extending at an angle with respect to the walls of said second group of passages, said angle being at least greater than zero degrees, and said first group of passages being adapted to pass only the exhaust gas therethrough;
   b. means on said catalytic reactor for detecting the temperature in said bed and producing a signal representing the detected temperature, and
   c. means operable in response to the signal from said temperature detecting means to supply temperature controlling air to said catalytic reactor, said second group of passages in said bed passing only the temperature controlling air therethrough to maintain said catalytic reactor substantially within a predetermined temperature range.

2. A system according to claim 1, in which said signal responsive means includes a blower pneumatically connected to said housing, said blower being adapted to be operated when the temperature in said catalytic reaction bed is outside said predetermined temperature range.

3. A system according to claim 2, in which said catalytic reaction bed is formed of a catalyst carrier which includes at least a unit of laminated structure comprising a plurality of sheets of heat-resistant material, and wherein said walls include at least one of said sheets being formed with grooves in at least one of the major surfaces thereof, the grooved sheet cooperating with adjacent sheets to define passages extending through said laminated structure.

4. A system according to claim 3, in which said laminated structure unit includes a pair of corrugated sheets defining said grooves and a substantially flat sheet sandwiched between said corrugated sheets, one of said corrugated sheets cooperating with said substantially flat sheet to define therebetween at least a part of said first group of passages while the other corrugated sheet cooperates with said susbstantially flat sheet to define therebetween at least a part of said second group of passages.

5. A system according to claim 4, in which said laminated structure unit includes substantially flat additional sheets of a similar heat-resistant material disposed on the outer surfaces of said corrugated sheets, respectively, one of said additional sheet cooperating with said one corrugated sheet to define therebetween another part of said first group of passages while the other of said additional sheets cooperates with said the other corrugated sheet to define therebetween another part of said second group of passages, said one corrugated sheet being so arranged with respect to said the other corrugated sheet that said first group of said passages extend at said angle with respect to said second group of passages.

6. A system according to claim 4, in which said signal responsive means includes a comparator which receives the signal from said temperature detecting means, electric circuit means including a motor drivingly connected to said blower, switch means in said electric circuit means, comparator means operative to compare the signal from said temperature detecting means with a reference signal and emit an output signal, actuator means operatively connected to said switch means, said actuator means being operative in response to said output signal to open and close said switch means, the arrangement being such that said actuator means operate to close said switch means for the energization of said motor when the temperature in said catalytic reaction bed exceeds said predetermined temperature.

7. A system according to claim 6, in which said actuator means comprises a solenoid unit including an electromagnetic coil and an armature movable therein, said armature being operatively connected to said switch means, said comparator means including a comparing circuit having an electric power source supplying said reference signal and a potentiometer operative to compare said reference signal with the signal from said temperature detecting means and emit an output signal to said solenoid unit.

8. A system for purifying exhaust gas from an internal combustion engine, said system comprising:
 a. a catalytic reactor including a housing and a catalytic reaction bed disposed therein, said bed including a plurality of walls defining therein first and second groups of passages arranged in heat-exchange relationship, the walls of said first group of passages extending at an angle with respect to the walls of said second group of passages, said angle being at least greater than zero degrees, and said frist group of passages being adapted to pass only the exhaust gas therethrough;
 b. means on said catalytic reactor for detecting the temperature in said bed and producing a signal representing the detected temperature; and
 c. means operable in response to the signal from said temperature detecting means to supply temperature controlling air to said catalytic reactor;
 d. said signal responsive means including a blower pneumatically connected to said housing to cause only the temperature controlling air to flow through said second group of passages, said blower being adapted to be operated when the temperature in said catalytic reaction bed is outside a predetermined temperature range, said signal responsive means further including means for heating the temperature controlling air supplied by said blower to said catalytic reactor, said heating means being adapted to be energized when the temperature in said catalytic reaction bed is lower than the lower limit of said predetermined temperature range, wherein said catalytic reaction bed is heated by the heated temperature controlling air.

9. A system according to claim 8, in which said catalytic reaction bed is formed of a catalyst carrier which includes a laminated structure comprising a plurality fo sheets of heat resistant material and wherein said walls include a pair of corrugated sheets defining grooves and a substantially flat sheet sandwiched between said corrugated sheets, one of said corrugated sheets cooperating with said substantially flat sheet to define therebetween at least a part of said first group of passages while the other corrugated sheet cooperates with said substantially flat sheet to define therebetween at least a part of said second group of passages.

10. A system according to claim 9, in which said laminated structure unit includes substantially flat additional sheets of a similar heat-resistant material disposed on the outer surfaces of said corrugated sheets, respectively, one of said additional sheet cooperating with said one corrugated sheet to define therebetween another part of said first group of passages while the other of said additional sheets cooperates with the other corrugated sheet to define therebetween another part of said second group of passages, said one corrugated sheet being so arranged with respect to said the other corrugated sheet that said first group of said passages extend at said angle with respect to said second group of passages.

11. A system according to claim 9, in which said signal responsive means includes a comparator which receives the signal from said temperature detecting means, first electric circuit means including a motor drivingly connected to said blower, second electric circuit means including said heating means, first switch means in said first electric circuit means, second switch means in said second electric circuit means and adapted to be opened when the temperature in said catalytic reaction bed is higher than the lower limit of said predetermined temperature range, comparator means operative to compare the signal from said temperature detecting means with reference signals and emit output signals, actuator means operatively connected to said first and second switch means, said actuator means being operative in response to said output signals to open and close said first and second switch means, the arrangement being such that said actuator means operate to close said first switch means for the energization of said motor when the temperature in said catalytic reaction bed is outside said predetermined temperature range, said actuator means being also operative to close said second switch means for the energization of said heating means when the temperature in said catalytic reaction bed is lower than the lower limit of said predetermined temperature range.

12. A system according to claim 11, in which said actuator means comprise first and second solenoid units each including an electromagnetic coil and an armature movable therein, the armature of said first solenoid unit being operatively connected to said first switch means, the armature of said second solenoid unit being operatively connected to said first and second switch means, said comparator means including first and second comparing circuits, said first comparing circuit including a first electric power source supplying a first reference signal and a first potentiometer operative to compare said first reference signal with the signal from said temperature detecting means and emit a first output signal to said first solenoid unit, said second comparing circuit including a second electric power source supplying a second reference signal and a second potentiometer operative to compare said second reference signal with the signal from said temperature detecting means and emit a second output signal to said second solenoid unit.

13. A system according to claim 12, in which said temperature detecting means comprises a thermocouple.

* * * * *